United States Patent
Lee

Patent Number: 5,983,189
Date of Patent: Nov. 9, 1999

[54] CONTROL DEVICE FOR CONTROLLING THE STARTING A VEHICLE IN RESPONSE TO A VOICE COMMAND

[75] Inventor: See-Woo Lee, Seongnam, Rep. of Korea

[73] Assignee: Samsung Electronics Co., Ltd., Kyungki-do, Rep. of Korea

[21] Appl. No.: 08/841,623

[22] Filed: Apr. 30, 1997

[30] Foreign Application Priority Data

Aug. 27, 1996 [KR] Rep. of Korea ............ 35864/96

[51] Int. Cl.⁶ .................................................. G10L 7/08
[52] U.S. Cl. ........................................ 704/275; 704/273
[58] Field of Search ........................ 704/275, 270, 704/272, 273, 219, 258, 262, 200, 216, 217

[56] References Cited

U.S. PATENT DOCUMENTS

| | | | |
|---|---|---|---|
| 4,459,674 | 7/1984 | Sakurai | 364/513.5 |
| 4,912,458 | 3/1990 | Comeau et al. | 340/576 |
| 5,432,509 | 7/1995 | Kajiwara | 340/903 |
| 5,450,525 | 9/1995 | Russell et al. | 704/275 |
| 5,488,353 | 1/1996 | Kawakami et al. | 340/576 |
| 5,548,647 | 8/1996 | Naik et al. | 704/246 |
| 5,694,116 | 12/1997 | Kojima | 340/576 |
| 5,704,008 | 12/1997 | Duvall, Jr. | 704/275 |
| 5,719,950 | 2/1998 | Osten et al. | 382/115 |
| 5,774,858 | 6/1998 | Taubkin et al. | 704/273 |

*Primary Examiner*—Richemond Dorvil
*Attorney, Agent, or Firm*—Sughrue, Mion, Zinn, Macpeak & Seas, PLLC

[57] ABSTRACT

A device for sensing whether a driver has been drinking by analyzing the driver's voice, which includes a parameter extractor for producing a parameter corresponding to a linear prediction coefficient-cepstrum coefficient extracted from a digital signal obtained by converting the sound of the voice command, a storage device for storing a reference parameter extracted from the voice of the driver when the driver is sober, a comparator for comparing a current parameter extracted by the extractor with the reference parameter so as to produce a difference signal representing the deviation, and a decision circuit for determining whether the driver has been drinking in accordance with the deviation value. The parameter extractor generates the linear prediction coefficient-cepstrum coefficient after producing a linear prediction coefficient by performing auto-correlation on the digital voice signal.

28 Claims, 5 Drawing Sheets

|  | A | I | U | E | O |
|---|---|---|---|---|---|
| $C_1$ | 0.00 | 0.00 | 0.00 | 0.00 | 0.00 |
| $C_2$ | 0.538 | 0.256 | 0.046 | 0.135 | 0.071 |
| $C_3$ | 0.086 | 0.312 | 0.088 | 0.206 | 0.121 |
| $C_4$ | 0.110 | 0.323 | 0.132 | 0.237 | 0.159 |
| $C_5$ | 0.126 | 0.322 | 0.178 | 0.249 | 0.190 |
| $C_6$ | 0.126 | 0.320 | 0.202 | 0.259 | 0.207 |
| $C_7$ | 0.130 | 0.312 | 0.231 | 0.271 | 0.216 |
| $C_8$ | 0.130 | 0.305 | 0.267 | 0.279 | 0.214 |
| $C_9$ | 0.124 | 0.296 | 0.303 | 0.272 | 0.210 |
| $C_{10}$ | 0.126 | 0.289 | 0.345 | 0.262 | 0.206 |

*Fig. 2A*

|  | A | I | U | E | O |
|---|---|---|---|---|---|
| $C_1$ | 0.00 | 0.00 | 0.00 | 0.00 | 0.00 |
| $C_2$ | 0.082 | 0.169 | 0.095 | 0.110 | 0.090 |
| $C_3$ | 0.139 | 0.255 | 0.200 | 0.185 | 0.151 |
| $C_4$ | 0.177 | 0.302 | 0.253 | 0.286 | 0.199 |
| $C_5$ | 0.193 | 0.317 | 0.335 | 0.275 | 0.234 |
| $C_6$ | 0.204 | 0.336 | 0.404 | 0.308 | 0.260 |
| $C_7$ | 0.212 | 0.355 | 0.500 | 0.337 | 0.284 |
| $C_8$ | 0.232 | 0.369 | 0.600 | 0.363 | 0.316 |
| $C_9$ | 0.248 | 0.389 | 0.727 | 0.392 | 0.351 |
| $C_{10}$ | 0.239 | 0.422 | 0.888 | 0.430 | 0.374 |

*Fig. 2B*

CONTROL DEVICE FOR CONTROLLING THE STARTING A VEHICLE IN RESPONSE TO A VOICE COMMAND

BACKGROUND OF THE INVENTION

1. Field of the Invention

The present invention is directed to a control device for controlling the starting of a vehicle by means of voice recognition of the driver, and more particularly, to a control device for controlling the starting of a vehicle to start the engine based on the result of the voice recognition operation.

2. Description of the Related Art

The present voice recognition technology is applied not only to the fields of hand phones, vehicles, automatic translators, automatic switching systems, computers, voice recognition word processors and toys, but also to the field of social welfare such as supplementary terminals for disabled people.

By utilizing voice recognition technology, equipment or machinary need not be manually operated. For example, a driver can start a vehicle by simply speaking a word such as "start".

However, while voice recognition systems provide convenience, they are not without adverse effects. For example, while voice recognition techniques enable a vehicle to be started when the driver simply speaks the word "start", the techniques do not determine whether the driver is in a condition to safely operate the vehicle. More particularly, the voice recognition devices cannot determine whether the driver has been drinking alcohol, and therefore, should not be operating a vehicle.

SUMMARY OF THE INVENTION

It is an object of the present invention to provide a control device for controlling the starting of a vehicle by means of voice recognition only when the driver has not been drinking.

It is another object of the present invention to provide a control device for controlling the starting of a vehicle which also prevents the vehicle from starting according to a determination that the driver has been drinking where the determination is made by sensing the driver's voice.

It is still another object of the present invention to provide a sensing device for determining a driver's drinking state by analyzing the driver's voice.

It is a further object of the present invention to provide a control device for controlling the starting of a vehicle to protect a driver's life and property by preventing a car accident from occurring.

According to an embodiment of the present invention, a device for sensing whether the driver has been drinking by analyzing the driver's voice, comprises a parameter extractor for producing a parameter corresponding to a linear prediction coefficient-cepstrum coefficient extracted from a digital signal obtained by converting the sound of a voice command given by the driver, a storage means for storing a reference parameter, extracted from the voice of the driver when the driver had not been drinking, a comparator for comparing a current parameter extracted by the extractor with the reference parameter so as to produce a difference signal representing the deviation, and a decision circuit for determining whether the driver has been drinking based on whether the deviation value is above a reference value. The parameter extractor generates the linear prediction coefficient-cepstrum coefficient after producing a linear prediction coefficient by performing auto-correlation on the digital voice signal.

According to another embodiment of the present invention, a control device for starting a vehicle by means of a voice command of a driver, comprises a parameter extractor for producing a parameter corresponding to a linear prediction coefficient-cepstrum coefficient extracted from a digital signal obtained by converting the sound of the voice command, a decision circuit for comparing the parameter with a reference parameter, obtained from the voice of the driver when the driver had not been drinking, so as to decide whether the driver is drunk or not, and a controller for controlling the starting of the vehicle according to the output of the decision circuit. A warning message sender is provided for giving a warning to the driver when it has been determined that the driver has been drinking.

The parameter extractor generates a linear prediction coefficient-cepstrum coefficient after producing a linear prediction coefficient by performing auto-correlation on the digital voice signal. The decision circuit comprises a comparator for comparing the parameter with a reference parameter, obtained from the voice of the driver when the driver had not been drinking, to generate a difference signal representing a deviation, and a code sender for sending a code to the warning message sender or controller. A warning message sender comprises a voice synthesizer for synthesizing a voiced warning in response to the code representing that the driver is drunk, and a speaker for giving out the voiced warning. Thus, the inventive control device protects a drunken driver from automobile accidents.

BRIEF DESCRIPTION OF THE DRAWINGS

A more complete appreciation of this invention, and many of the attendant advantages thereof, will be readily apparent by reference to the following detailed description when considered in conjunction with the accompanying drawings, in which like reference symbols indicate the same or similar components, wherein:

FIGS. 2A and 2B are charts for respectively illustrating the value of a linear prediction coefficient-a cepstrum coefficient of the driver when the driver has been drinking and when the driver has not been drinking extracted by the parameter extractor;

DETAILED DESCRIPTION OF PREFERRED EMBODIMENTS

The terminology used afterward is defined by considering the function on the present invention and can be changed by a chip designer and/or a user according to their intention or custom, but the definition should be based on the general description of the present invention.

Figure 1:
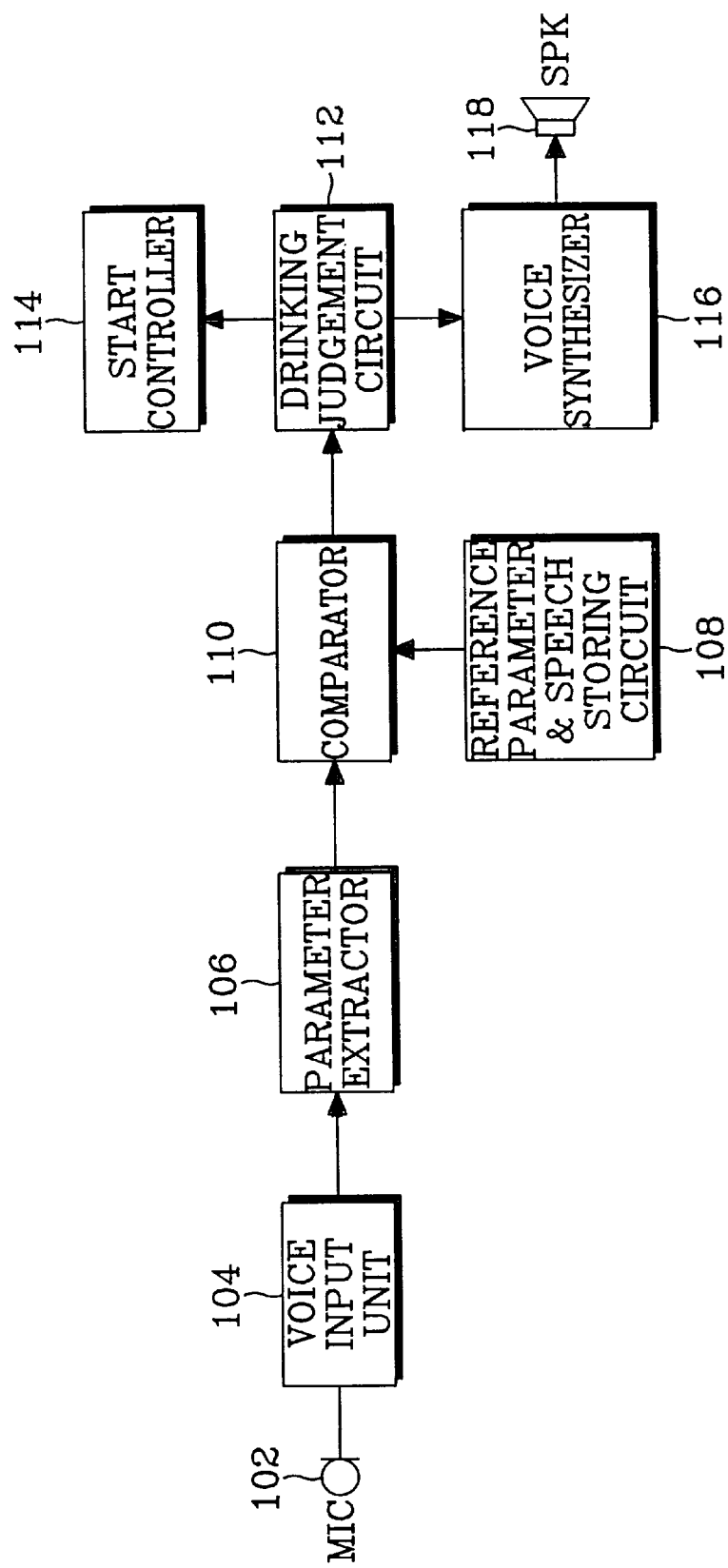
FIG. 1 is a schematic diagram for illustrating a configuration of a control device for controlling the starting of a vehicle according to the present invention.

Referring to FIG. 1, a control device for controlling the starting of a vehicle in response to the voice of the driver includes a device for sensing a drinking state of the driver comprising a microphone 102, a voice input unit 104, a parameter extractor 106, a reference parameter & voice storing circuit 108, a comparator 110, a start controller 114, a drinking judgement circuit 112, a voice synthesizer 116, and a speaker 118.

The microphone 102 performs the function of supplying a driver's voice to the voice input unit 104. The microphone generally includes a directional microphone which is installed in the interior of a vehicle. The voice input unit 104 comprises an amplifier for amplifying the voice from the microphone 102 to a predetermined level and an analog/digital converter for converting the output from the amplifier to a digital signal. The parameter extractor 106 analyzes the digital voice signal supplied from the voice input unit 104 and generates a parameter. The parameter is the element used for judging whether a driver has been drinking. A linear prediction coefficient-cepstrum coefficient is utilized as the parameter in the present invention.

The parameter extractor 106 extracts a linear prediction coefficient (LPC) from the voice signal after processing the digital voice signal from the voice input unit 104 in a predetermined frame unit by auto correlation. The LPC is determined by taking a spectrum decomposition from a predicted value and an error obtained by applying a linear operation on the sampled value of a stationary stochastic process. The parameter extractor 106 generates an output as a parameter after acquiring a cepstrum coefficient from the LPC. The cepstrum coefficient is obtained by performing a reverse Fourier conversion of a power spectrum obtained by performing a Fourier conversion of the LPC of the voice signal. The comparator 110 compares the LPC-cepstrum coefficient (hereinafter referred to as "parameter") generated from the parameter extractor 106 with the reference parameter stored in the reference parameter & voice storing circuit 108. The reference parameter is produced from the parameter extractor 106 when the driver has not been drinking. The comparator 110 outputs a value representing the variation between the parameter and the reference parameter. Further, a predetermined voice signal is stored in the reference parameter & storing circuit 108.

The drinking judgement circuit 112 outputs a code indicating that the driver has not been drinking when the variation value output by the comparator is not more than a command value set in the start controller 114. The drinking judgement circuit 112 outputs another code indicating that the driver has been drinking when the variation detected by the comparator 110 is more than the command value set in the voice synthesizer 116. The start controller 114 starts a vehicle when the code corresponding to the condition where the driver has not been drinking is output. The voice synthesizer 116 sends a warning message through the speaker 118 to the driver, by synthesizing a voice signal stored in the reference parameter & voice storing circuit 108, when the code corresponding to the condition where the driver has been drinking is output. The warning message may be "Please don't drive your car; you have been drinking".

FIG. 2A is a chart illustrating parameters corresponding to a voice of a driver when the driver has not been drinking, and FIG. 2B is a chart illustrating parameters corresponding to a voice of a driver when the driver has been drinking. The LPC-cepstrum coefficient is calculated by a formula described as follows:

$$C1 = -\alpha 1.$$

$$C_n = -\alpha \left(1 - \sum_{i=1}^{n-1} \frac{i}{n}\right) \alpha_i C_{n-i}$$

In the formula, "$\alpha$" represents a LPC-cepstrum coefficient and "n" represents a degree or level. Normally the number of levels is preferably set between 8 and 10, and it is noted that the present invention is described where the number of levels of the parameter is 10.

FIGS. 2A and 2B illustrate the 10 degrees or levels of parameters corresponding to each voice signal for "a", "e", "i", "o", and "u". Referring to FIGS. 2A and 2B, there is a difference between the parameters extracted from the voice of the driver when the driver has been drinking and those of the driver when the driver has not been drinking. For example, the parameter corresponding to the sound of "a" spoken by a driver that has not been drinking is 0.538, but it is 0.082 in case of where the driver has been drinking.

Figure 3A:
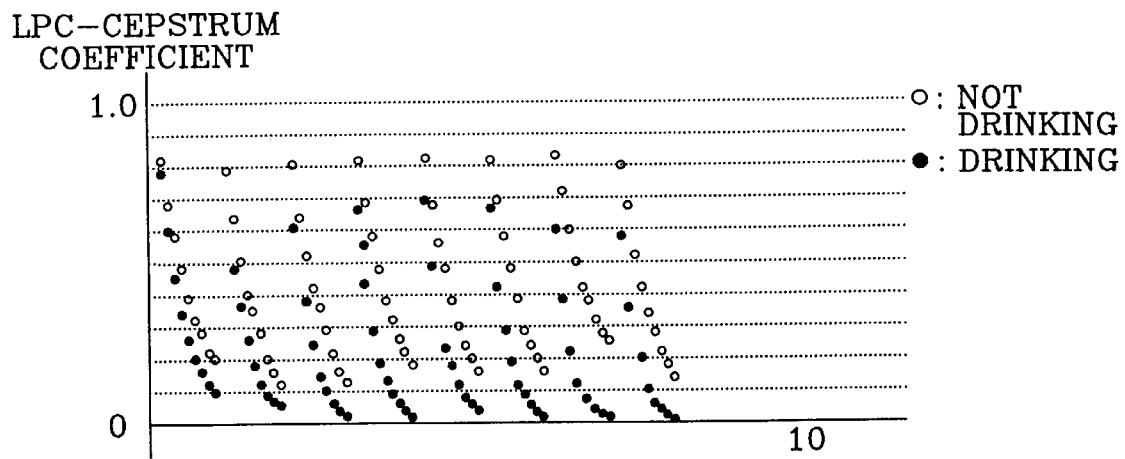
FIGS. 3A and 3B respectively illustrate a distribution of a linear prediction coefficient-a cepstrum coefficient of a driver which has been drinking and of a driver which has not been drinking.
Figure 3B:
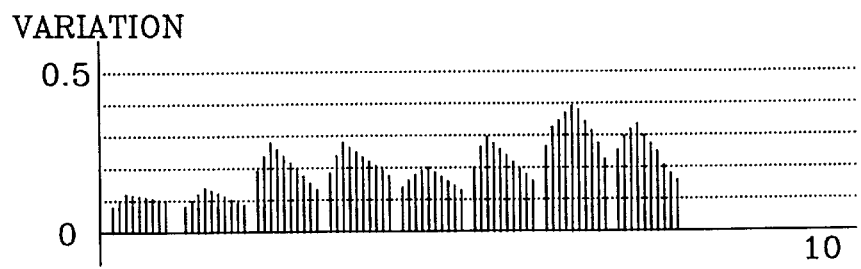

FIGS. 3A and 3B are graphs illustrating a distribution of parameters of voices pronounced each one time in the case of drinking and not drinking. The parameters indicated as a white circle correspond to the case of not drinking and those with a black circle correspond to the case of drinking.

Referring to FIG. 3A, it is understood that the parameters in the case of drinking vary remarkably in comparison with those in the case of not drinking. Referring to FIG. 3B, the variation between the parameters in the case of drinking and those in the case of not drinking is more than 0.1 at least. The theory of the said distribution of the parameters was announced as a thesis entitled, "A comparison between a voice in case of drinking and that of not drinking" on the paper, vol. no. 6029 of ISCIE (Institute of Systems Control and Information Engineer) on Mar. 19, 1993 by the inventor.

Figure 4:
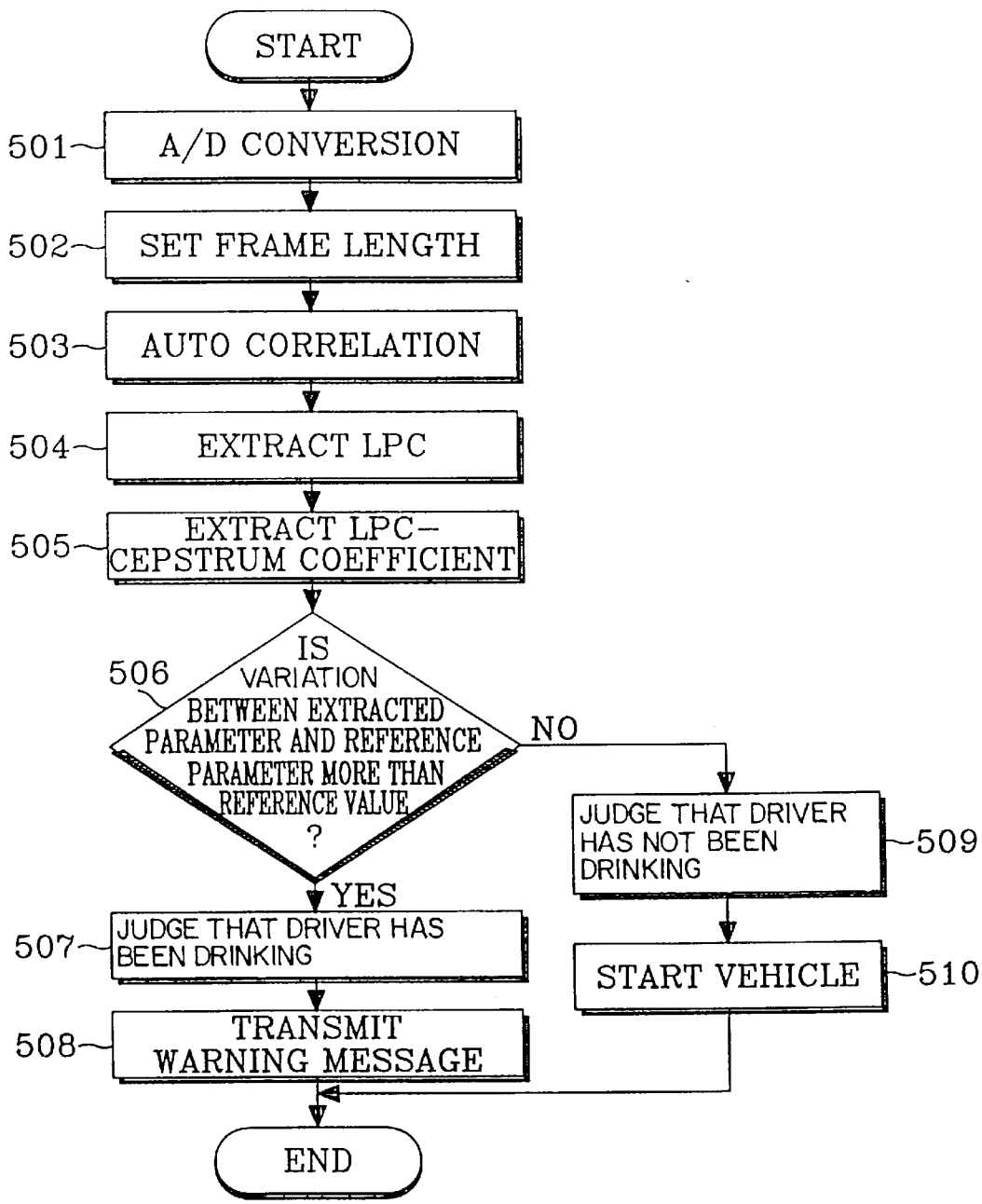
FIG. 4 is a flow chart for illustrating the operation of the control device according to the present invention.

The operation of the present invention will be described with reference to FIG. 4. A voice signal corresponding to a command such as "start" pronounced by a driver is sent through a microphone 102 to the voice input unit 104. The voice input unit 104 converts an analog voice signal to a digital voice signal powered by 10 KHz and 12 bits at step 501.

The parameter extractor 106 sets a length of frame for processing the digital voice signal from the voice input unit 104, and performs an auto correlation operation on the digital voice signal by the length of frame set forth at step 503. The parameter extractor 106 extracts a LPC from the digital voice signal processed by auto correlation at step 504, and produces a LPC-cepstrum coefficient as a parameter after producing a cepstrum coefficient at step 505. Afterwards the comparator 110 calculates a variation by comparing the parameter from the parameter extractor 106 with the reference parameter set forth and stored in the reference parameter & voice storing circuit 108. The drinking judgement circuit 112 determines whether the variation is more than a reference value (0.1 for example) at step 506. When the variation is more than the reference value, the drinking judgement circuit 112 sends a code representing a drinking state after judging that the driver has been drinking, to a voice synthesizer 116 at step 507.

Thereafter, the voice synthesizer 116 sends a warning message not to drive through a speaker 118 by synthesizing the voice signal stored in the reference parameter & voice storing circuit 108 at step 508. When the variation is not more than the reference value, the drinking judgement circuit 112 outputs a code representing a non-drinking state at step 509. Lastly, in step 510, a start controller 114 starts a vehicle in response to a result of judgement so as to run the vehicle.

While a specific example of the invention has been described herein, it is to be understood that various modifications may be apparent to one skilled in the art without departing from the spirit and scope of the invention.

What is claimed is:

1. A control device for controlling the starting of a vehicle in response to a voice command from a driver, comprising:

means for receiving said voice command from the driver and for generating a digital voice signal corresponding to said voice command;

means for determining whether the driver has been drinking alcohol based upon said digital voice signal and for outputting an indication signal; and means for controlling the starting of the vehicle in accordance with said indication signal.

2. The control device according to claim 1, wherein said means for controlling the starting of the vehicle is arranged to start the vehicle when said indication signal indicates that the driver has not been drinking alcohol, and to prevent the vehicle from starting when said indication signal indicates that the driver has been drinking alcohol.

3. The control device according to claim 1, wherein said means for receiving said voice command comprises:

a microphone; and a voice input unit which converts said voice command to said digital voice signal.

4. The control device according to claim 1, wherein said means for determining whether the driver has been drinking alcohol comprises:

a parameter extractor for generating a parameter corresponding to a linear prediction coefficient-cepstrum coefficient extracted from said digital voice signal;

a memory for storing a reference parameter corresponding to the voice command of the driver issued when the driver had not been drinking alcohol;

a comparator for comparing said parameter and said reference parameter and for outputting a variation value; and a drinking judgment circuit for comparing said variation value with a predetermined value to determine whether the driver has been drinking alcohol and for outputting a code signal.

5. The control device according to claim 4, wherein said means for controlling the starting of the vehicle comprises a start controller for starting the vehicle in response to said code signal output from said drinking judgment circuit indicating that the driver has not been drinking alcohol.

6. The control device according to claim 4, further comprising a voice synthesizer for synthesizing a voice signal stored in said memory corresponding to a warning message in response to said code signal output from said drinking judgment circuit indicating that the driver has been drinking alcohol.

7. The control device according to claim 4, wherein said means for controlling the starting of the vehicle comprises a start controller for starting the vehicle in response to a code output from said drinking judgment circuit indicating that the driver has not been drinking alcohol.

8. The control device according to claim 4, further comprising a voice synthesizer for synthesizing a voice signal stored in said memory corresponding to a warning message in response to a code output from said drinking judgment circuit indicating that the driver has been drinking alcohol.

9. A control device for controlling the starting of a vehicle in response to a voice command from a driver, comprising:

a voice input unit for receiving said voice command and for converting said voice command to a digital voice signal;

a parameter extractor for outputting a parameter corresponding to a linear prediction coefficient-cepstrum coefficient extracted from said digital voice signal;

a decision circuit for comparing said parameter with a reference parameter, corresponding to the voice command of the driver issued when the driver had not been drinking alcohol, to determine whether the driver has been drinking alcohol; and a controller for controlling the starting of the vehicle in accordance with an output from said decision circuit.

10. The control device according to claim 9, further comprising a warning message output circuit for outputting a warning to the driver when the output from the decision circuit indicates that the driver has been drinking alcohol.

11. The control device according to claim 10, wherein said decision circuit is arranged to output a code signal to one of said controller and said warning message output circuit.

12. The control device according to claim 11, wherein said warning message output circuit comprises:

a voice synthesizer for synthesizing a voiced warning in response to said second code indicating that the driver has been drinking alcohol; and a speaker for outputting a synthesized warning signal.

13. The control device according to claim 9, wherein said parameter extractor is arranged to generate a linear prediction coefficient from said digital voice signal, and to generate said linear prediction coefficient-cepstrum coefficient by performing an auto-correlation operation on said digital voice signal.

14. The control device according to claim 9, wherein said decision circuit comprises:

a comparator for comparing said parameter with said reference parameter to generate a difference signal representing a deviation value; and a drinking judgement circuit for sending a first code to said controller when said deviation is less than a predetermined value, and for sending a second code to said warning message output circuit when said deviation is at least equal to said deviation.

15. A device for determining whether a driver has been drinking alcohol based on the driver's voice, comprising:

a voice input unit for receiving a voice command from the driver and for converting said voice command into a digital voice signal;

a parameter extractor for producing a parameter corresponding to a linear prediction coefficient-cepstrum coefficient extracted from said digital voice signal and for outputting said parameter;

a memory for storing a reference parameter, corresponding to the voice command of the driver issued when the driver had not been drinking alcohol;

a comparator for comparing said parameter extracted by said parameter extractor with said reference parameter to determine a difference signal representing a deviation value; and a decision circuit for determining whether the driver has been drinking alcohol according to said deviation value.

16. The device according to claim 15, wherein said decision circuit is arranged to compare said deviation value with a predetermined value and to determine that the driver has been drinking alcohol when said deviation value is above said predetermined value and to determine that the driver has not been drinking alcohol when said deviation value is less than said predetermined value.

17. The device according to claim 15, wherein said parameter extractor is arranged to generate said linear prediction coefficient-cepstrum coefficient after producing a linear prediction coefficient by performing an autocorrelation operation on said digital voice signal.

18. A method for controlling the starting of a vehicle in response to a voice command from a driver, comprising the steps of:

generating a digital voice signal corresponding to said voice command;

determining whether the driver has been drinking alcohol based upon said digital voice signal;

outputting an indication signal indicating whether the driver has been drinking alcohol; and controlling the starting of the vehicle in accordance with said indication signal.

19. The method according to claim 18, wherein said controlling step comprises the steps of:

starting the vehicle when said indication signal indicates that the driver has not been drinking alcohol; and preventing the starting of the vehicle when said indication signal indicates that the driver has been drinking alcohol.

20. The method according to claim 18, wherein said determining step comprises the steps of:

generating a parameter corresponding to a linear prediction coefficient-cepstrum coefficient extracted from said digital voice signal;

storing a reference parameter corresponding to the voice command of the driver issued when the driver had not been drinking alcohol;

comparing said parameter and said reference parameter;

outputting a variation value resulting from said comparing step;

comparing said variation value with a predetermined value to determine whether the driver has been drinking alcohol.

21. The method according to claim 20, further comprising the step of:

starting the vehicle when the variation value is below said predetermined value indicating that the driver has not been drinking alcohol.

22. The method according to claim 20, further comprising the steps of:

synthesizing a voice signal corresponding to a warning message when a result of said comparing step indicates that the driver has been drinking alcohol.

23. A method for controlling the starting of a vehicle in response to a voice command from a driver, comprising the steps of:

converting said voice command into a digital voice signal;

generating a parameter corresponding to a linear prediction coefficient-cepstrum coefficient extracted from said digital voice signal;

comparing said parameter with a reference parameter, corresponding to the voice command of the driver issued when the driver had not been drinking alcohol, to determine whether the driver has been drinking alcohol; and controlling the starting of the vehicle in accordance with a result of said comparing step.

24. The method according to claim 23, further comprising the step of:

outputting a warning to the driver when the result of said comparing step indicates that the driver has been drinking alcohol.

25. The method according to claim 23, further comprising the steps of:

outputting a deviation signal representing a result of said comparing step;

outputting a first code signal when said deviation signal is less than a predetermined value indicating that the driver has not been drinking alcohol; and outputting a second code signal when said deviation signal is at least equal to said predetermined value indicating that the driver has been drinking alcohol.

26. The method according to claim 24, wherein said step of outputting a warning comprises the steps of:

synthesizing a voiced warning signal when the result of said comparing step indicates that the driver has been drinking alcohol; and outputting a synthesized warning signal.

27. A method for determining whether a driver has been drinking alcohol based on the driver's voice, comprising the steps of:

receiving a voice command from the driver;

converting the voice command into a digital voice signal;

producing a parameter corresponding to a linear prediction coefficient-cepstrum coefficient extracted from said digital voice signal;

storing a reference parameter corresponding to the voice command of the driver issued when the driver had not been drinking alcohol;

comparing said parameter with said reference parameter;

outputting a difference signal;

determining whether the driver has been drinking alcohol in accordance with said difference signal.

28. The method according to claim 27, wherein said determining step comprises the steps of:

comparing said difference signal with a predetermined value;

determining that the driver has been drinking alcohol when said difference signal is at least equal to said predetermined value; and determining that the driver has not been drinking alcohol when said difference signal is less than said predetermined value.

* * * * *